(12) United States Patent
Byrne et al.

(10) Patent No.: US 9,257,823 B2
(45) Date of Patent: Feb. 9, 2016

(54) LOW VOLTAGE POWER RECEPTACLE FOR MODULAR ELECTRICAL SYSTEMS

(71) Applicants: Norman R. Byrne, Ada, MI (US); Randell E. Pate, Jenison, MI (US); Roger D. Burdi, Grand Rapids, MI (US); Patrick E. Young, Rockford, MI (US)

(72) Inventors: Norman R. Byrne, Ada, MI (US); Randell E. Pate, Jenison, MI (US); Roger D. Burdi, Grand Rapids, MI (US); Patrick E. Young, Rockford, MI (US)

( * ) Notice: Subject to any disclaimer, the term of this patent is extended or adjusted under 35 U.S.C. 154(b) by 0 days.

(21) Appl. No.: 14/291,791

(22) Filed: May 30, 2014

(65) Prior Publication Data

US 2014/0357125 A1    Dec. 4, 2014

Related U.S. Application Data

(60) Provisional application No. 61/829,811, filed on May 31, 2013.

(51) Int. Cl.
| | |
|---|---|
| *H01R 25/00* | (2006.01) |
| *H02G 3/10* | (2006.01) |
| *H02G 3/38* | (2006.01) |
| *H01R 25/14* | (2006.01) |
| *H01R 25/16* | (2006.01) |

(52) U.S. Cl.
CPC ............ *H02G 3/105* (2013.01); *H01R 25/164* (2013.01); *H02G 3/386* (2013.01); *H01R 25/142* (2013.01); *H01R 25/162* (2013.01)

(58) Field of Classification Search
CPC .... H01R 25/142; H01R 25/14; H01R 25/006; H01R 25/16; H01R 25/161; H01R 25/162; H01R 25/164; H02G 3/105; H02G 3/386

USPC .................. 439/119, 211, 209, 210, 214–216
See application file for complete search history.

(56) References Cited

U.S. PATENT DOCUMENTS

| | | | |
|---|---|---|---|
| 1,187,010 | A | 6/1916 | Rodrigues |
| 2,313,960 | A | 3/1943 | O'Brien |
| 2,320,332 | A | 5/1943 | Morten |
| 2,540,575 | A | 2/1951 | Finizie |
| 4,135,775 | A | 1/1979 | Driscoll |
| 4,367,370 | A | 1/1983 | Wilson et al. |
| 4,382,648 | A | 5/1983 | Propst |
| 4,551,577 | A | 11/1985 | Byrne |
| 4,775,328 | A | 10/1988 | McCarthy |
| 4,781,609 | A | 11/1988 | Wilson et al. |
| 4,959,021 | A | 9/1990 | Byrne |
| 4,990,110 | A | 2/1991 | Byrne |
| 4,993,576 | A | 2/1991 | Byrne |
| 5,013,252 | A | 5/1991 | Nienhuis |
| 5,073,120 | A | 12/1991 | Lincoln |

(Continued)

*Primary Examiner* — Felix O Figueroa
(74) *Attorney, Agent, or Firm* — Gardner, Linn, Burkhart & Flory, LLP

(57) ABSTRACT

A low voltage power receptacle assembly is provided for use in a modular electrical system. The receptacle assembly includes a housing that defines an internal cavity for receiving a circuit board assembly that transforms a line voltage input to a lower voltage output. The housing may define a plurality of contact-receiving portions in spaced arrangement, and has at least two electrical contacts disposed in respective contact-receiving portions. A low voltage power receptacle is in communication with the circuit assembly and provides user-access to the low voltage output. Optionally, the size of the housing may be varied to suit a particular application, and a spacer may be used inside the cavity to ensure proper positioning of the low voltage power receptacle.

16 Claims, 10 Drawing Sheets

(56) References Cited

U.S. PATENT DOCUMENTS

| | | | |
|---|---|---|---|
| 5,096,431 | A | 3/1992 | Byrne |
| 5,096,434 | A | 3/1992 | Byrne |
| 5,164,544 | A | 11/1992 | Snodgrass |
| 5,178,555 | A | 1/1993 | Kilpatrick |
| 5,203,712 | A | 4/1993 | Kilpatrick et al. |
| 5,252,086 | A | 10/1993 | Russell et al. |
| 5,259,787 | A | 11/1993 | Byrne |
| 5,582,522 | A | 12/1996 | Johnson |
| 5,595,495 | A * | 1/1997 | Johnson et al. ............... 439/215 |
| 6,036,516 | A | 3/2000 | Byrne |
| 6,315,589 | B1 | 11/2001 | Inniss et al. |
| 6,405,139 | B1 | 6/2002 | Kicinski et al. |
| 6,445,571 | B1 | 9/2002 | Inniss et al. |
| 6,540,536 | B1 | 4/2003 | Young |
| 6,559,556 | B1 | 5/2003 | Wills |
| 6,857,896 | B2 | 2/2005 | Rupert et al. |
| 7,264,499 | B2 | 9/2007 | Kondas |
| 7,410,379 | B1 | 8/2008 | Byrne |
| 7,455,535 | B2 | 11/2008 | Insalaco et al. |
| 7,465,178 | B2 | 12/2008 | Byrne |
| 7,520,762 | B2 | 4/2009 | Lehman et al. |
| 7,559,795 | B2 | 7/2009 | Byrne |
| 7,641,510 | B2 | 1/2010 | Byrne |
| 7,905,737 | B2 | 3/2011 | Byrne |
| 8,033,846 | B2 * | 10/2011 | Youssefi-Shams et al. ... 439/172 |
| 8,317,547 | B2 | 11/2012 | Riner et al. |
| 8,350,406 | B2 | 1/2013 | Byrne et al. |
| 8,444,425 | B2 | 5/2013 | Byrne |
| 8,496,492 | B2 | 7/2013 | Byrne |
| 8,512,065 | B2 | 8/2013 | Byrne et al. |
| 8,585,419 | B2 | 11/2013 | Byrne |
| 8,680,709 | B2 | 3/2014 | Byrne et al. |
| 8,696,371 | B2 | 4/2014 | Byrne |
| 8,736,106 | B2 | 5/2014 | Byrne et al. |
| 8,790,126 | B2 | 7/2014 | Byrne |
| 8,801,445 | B2 | 8/2014 | Byrne |
| 2008/0214033 | A1 * | 9/2008 | Byrne .......................... 439/215 |
| 2012/0127637 | A1 | 5/2012 | Byrne et al. |
| 2013/0095681 | A1 | 4/2013 | Byrne |
| 2014/0065882 | A1 | 3/2014 | Byrne |
| 2014/0179132 | A1 | 6/2014 | Byrne |
| 2014/0322981 | A1 | 10/2014 | Byrne |

* cited by examiner

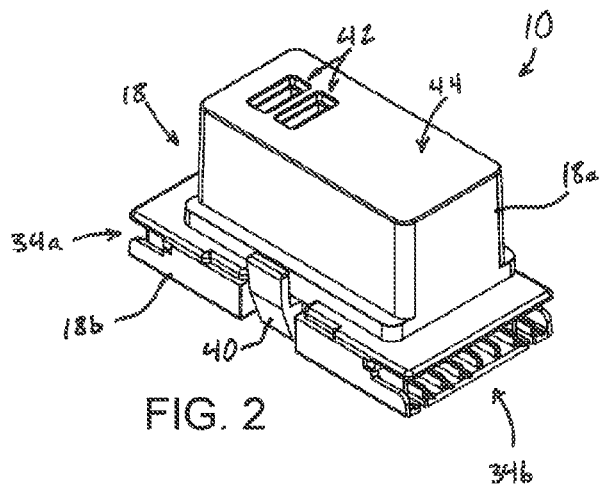
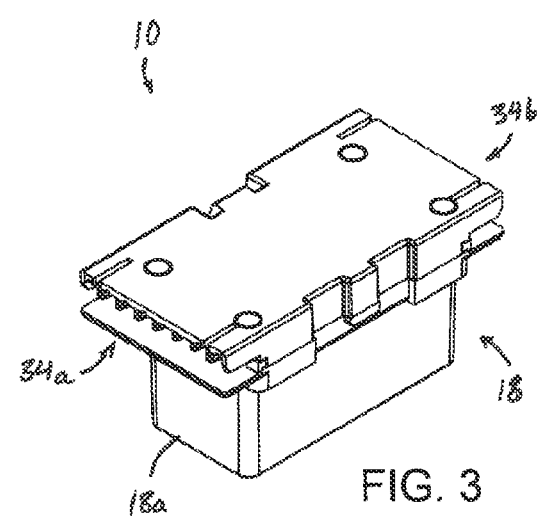
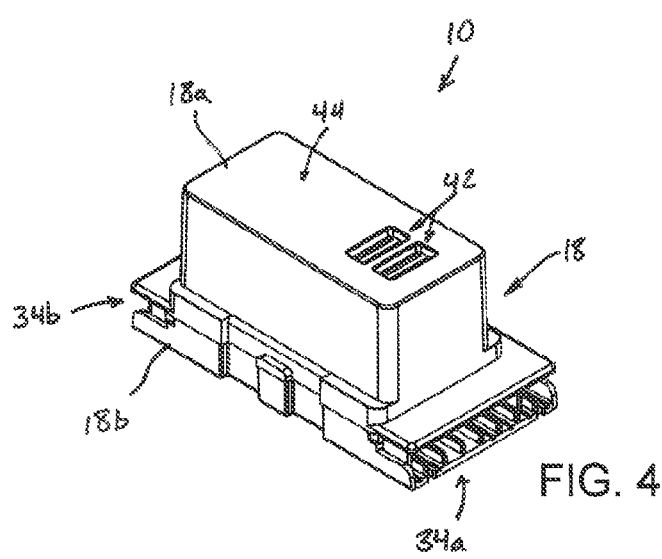

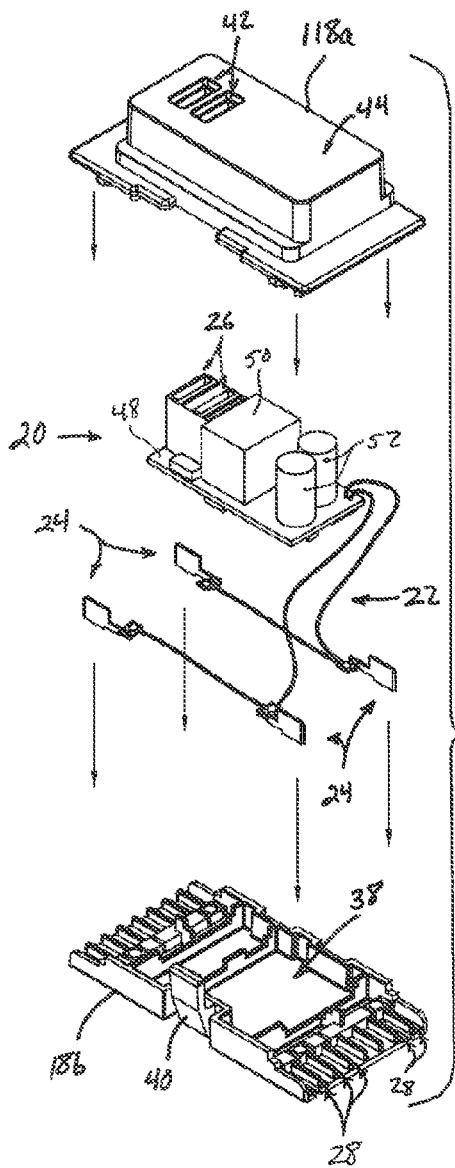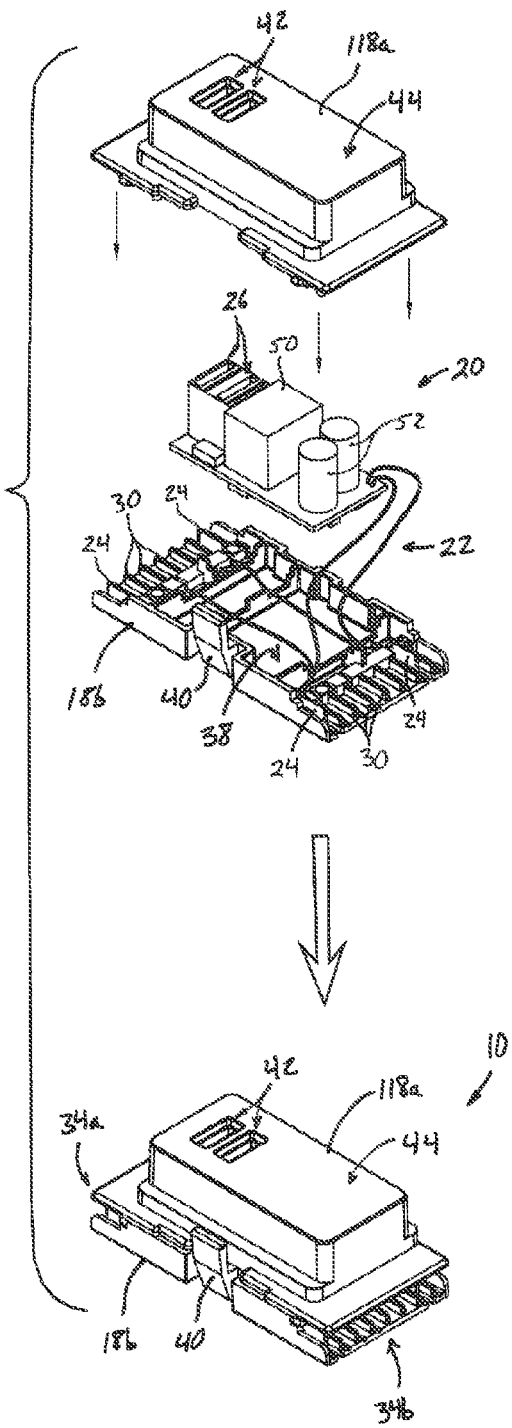

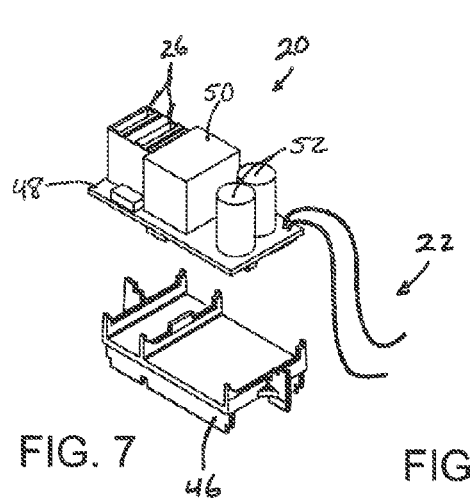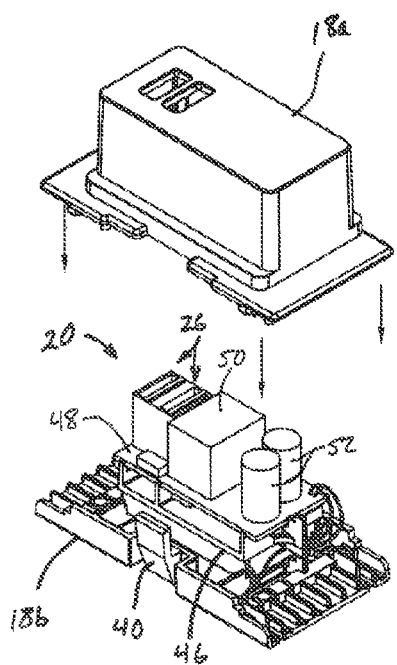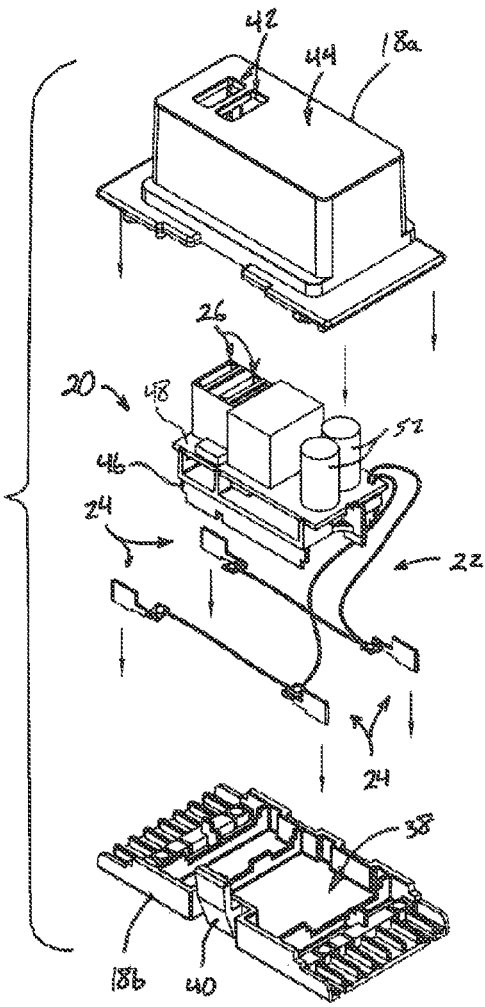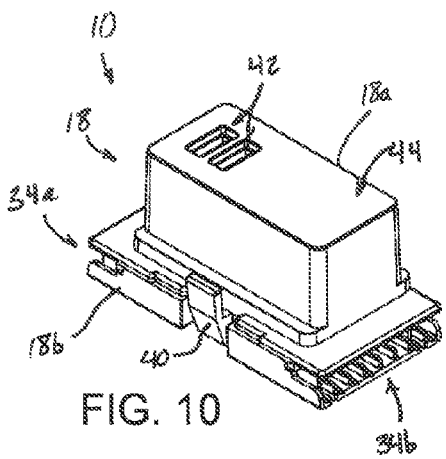

LOW VOLTAGE POWER RECEPTACLE FOR MODULAR ELECTRICAL SYSTEMS

CROSS REFERENCE TO RELATED APPLICATION

The present application claims the benefit of U.S. provisional application Ser. No. 61/829,811, filed May 31, 2013, which is hereby incorporated herein by reference in its entirety.

FIELD OF THE INVENTION

The present invention relates to low voltage electrical power and/or data outlets or receptacles for use in modular electrical systems.

BACKGROUND OF THE INVENTION

Low voltage power and data outlets, such as universal serial bus ("USB") power/data outlets and USB-style low voltage DC power outlets, are in increasing demand as the number of electrical and electronic devices that use such outlets continues to increase. Such devices may include, for example, mobile phones, digital media players, computers and computing devices, digital cameras, communications equipment, and the like. Therefore, there has been increasing demand for access to such outlets in work areas, homes, and even public spaces such as airports, shopping malls, etc.

SUMMARY OF THE INVENTION

The present invention provides a low voltage power receptacle assembly that is compatible for use in a modular electrical system, such as may be used for providing electrical power in a work area or the like. The low voltage power receptacle assembly includes a power transformer for reducing a line voltage (e.g., 110V AC or 220V AC) that supplies electrical power to standard receptacle outlets, down to a lower voltage (such as about 2V DC to about 12V DC, for example), so that the lower voltage can be made available to users at a low voltage power receptacle, such as a USB-style DC power receptacle, a coaxial DC power receptacle, or substantially any other type of low voltage receptacle. The low voltage power receptacle assembly of the present invention is compatible for use in multi-circuit modular electrical systems, and may include two or more "hot" electrical conductors that convey standard line voltage to a circuit board assembly that converts or transforms the power to a lower voltage power output for use by low voltage power consumers such as phones, computers, cameras, hand-held electronic devices such as media players, and the like.

According to one form of the present invention, a low voltage power receptacle assembly is provided for use in a modular electrical system. The receptacle assembly includes a housing that defines an internal cavity for receiving a circuit board assembly that transforms a line voltage input to a lower voltage output. The housing may define a plurality of contact-receiving portions in spaced arrangement, and has at least two electrical contacts disposed in respective contact-receiving portions. A low voltage power receptacle is in communication with the circuit assembly and provides user-access to the low voltage output. Optionally, the size of the housing may be varied, with a spacer such as a circuit board cradle placed inside the cavity to ensure proper positioning of the low voltage power receptacle.

In one aspect, the housing has opposite ends, each end having a coupler portion defining a respective set of the contact-receiving portions, and each coupler portion supporting at least two of the electrical contacts. Each of the coupler portions is configured to engage a corresponding coupler of a junction block assembly.

Optionally, the housing defines at least six of the contact-receiving portions at each coupler portion, and the electrical contacts are positionable in selected ones of the contact-receiving portions so that the position of the electrical contacts determines an electrical circuit to which the circuit board assembly is connected when the coupler portions engage a junction block assembly. Optionally, the contact-receiving portions of the housing are channels or slots formed in the housing.

In another aspect, the housing is a two-piece housing having a front housing piece and a rear housing piece, the front housing piece defining an opening that provides access to the low voltage power receptacle by an electrical connector of an electrical consumer, such as a mobile phone, a hand-held computer, or digital media player.

Optionally, multiple different front housing pieces are available for attachment to the rear housing piece, so that the front housing piece may be selected from at least a first front housing piece and a second front housing piece. The first front housing piece has a greater depth and the second front housing piece having a lesser depth. The rear housing piece is configured for coupling interchangeably to either of the first and second front housing pieces, and when the rear housing piece is coupled to the first front housing piece, the cavity is larger than when the rear housing piece is coupled to the second front housing piece.

In yet another aspect, the receptacle assembly includes a spacer disposed in the larger cavity when the rear housing piece is coupled to the first front housing piece. The spacer is configured to ensure proper positioning of the low voltage receptacle relative to the front housing piece.

In a further aspect, the circuit board assembly includes an electrical power transformer.

In a still further aspect, the circuit board assembly includes and supports the low voltage power receptacle, and the circuit board assembly is in electrical communication with the at least two electrical contacts via an electrical wire associated with each of the electrical contacts.

In still another aspect, the receptacle assembly is in combination with a modular electrical system. The modular electrical system includes a power supply line and a junction block assembly. The power supply line includes at least one hot conductor, a neutral conductor, and a ground conductor, with an upstream end portion configured to be electrically coupled to an AC power supply, and a downstream end portion configured to be electrically coupled to the low voltage power receptacle assembly. The junction block assembly is configured to electrically and mechanically couple to the low voltage power receptacle assembly, and to supply AC power from the power supply line to the circuit board assembly.

Optionally, the power supply line of the modular electrical system includes at least two hot conductors, with only one of the hot conductors being in electrical communication with the circuit board assembly of the low voltage power receptacle assembly.

Thus, the low voltage power receptacle assembly of the present invention provides convenient access to low voltage power, such as may be used for charging and/or providing power to low voltage power consumers, such as mobile phones, computers, and computing devices, digital cameras, media players, communications equipment, etc., in a manner that presents a finished appearance, and in a modular system that also permits reconfiguration and/or customization of the various high voltage and low voltage receptacles that may be provided within the system. Users are thus provided with access to low voltage charging outlets, such as USB-style outlets, without need for separate low voltage wiring systems in addition to a separate high voltage power system.

These and other objects, advantages, purposes and features of the present invention will become apparent upon review of the following specification in conjunction with the drawings.

BRIEF DESCRIPTION OF THE DRAWINGS

FIG. 2 is a front perspective view of another low voltage power receptacle, similar to the receptacle shown in FIG. 1;

FIG. 3 is a rear perspective view of the low voltage power receptacle of FIG. 2;

FIG. 4 is another front perspective view of the low voltage power receptacle of FIG. 2, taken from an opposite end thereof;

FIG. 5 is an exploded perspective view of the low voltage power receptacle of FIG. 1, showing a method of assembly;

FIG. 6 is another exploded perspective view of the low voltage power receptacle of FIG. 1, showing a method of assembly from a partially-assembled state to a fully-assembled state;

FIG. 7 is a perspective view of a circuit board assembly and cradle for use with the low voltage power receptacle of FIG. 2;

FIG. 8 is an exploded perspective view of the low voltage power receptacle of FIG. 2;

FIG. 9 is a front perspective view of the low voltage power receptacle of FIG. 8, shown partially assembled and prior to attachment of its outer cover;

FIG. 10 is a front perspective view of the low voltage power receptacle of FIG. 8, shown fully assembled and corresponding to FIG. 2;

DESCRIPTION OF THE PREFERRED EMBODIMENTS

A low voltage power receptacle assembly is provided for use within a modular electrical system, which is configurable to provide both high voltage line power (e.g., 110V AC or 220V AC) at standard power receptacles, while also providing low voltage power (e.g., about 2V DC to about 12V DC, or higher or lower as desired) within the same modular electrical system. The electrical system may be incorporated into raceways or other areas to provide electrical power in work areas or the like. As will be described in more detail below, the modular electrical system may be configured, reconfigured, and customized to provide a desired number of both high and low voltage outlets within a desired area, and typically incorporates or accommodates two or more circuits to increase the capacity of the system.

Figure 1:
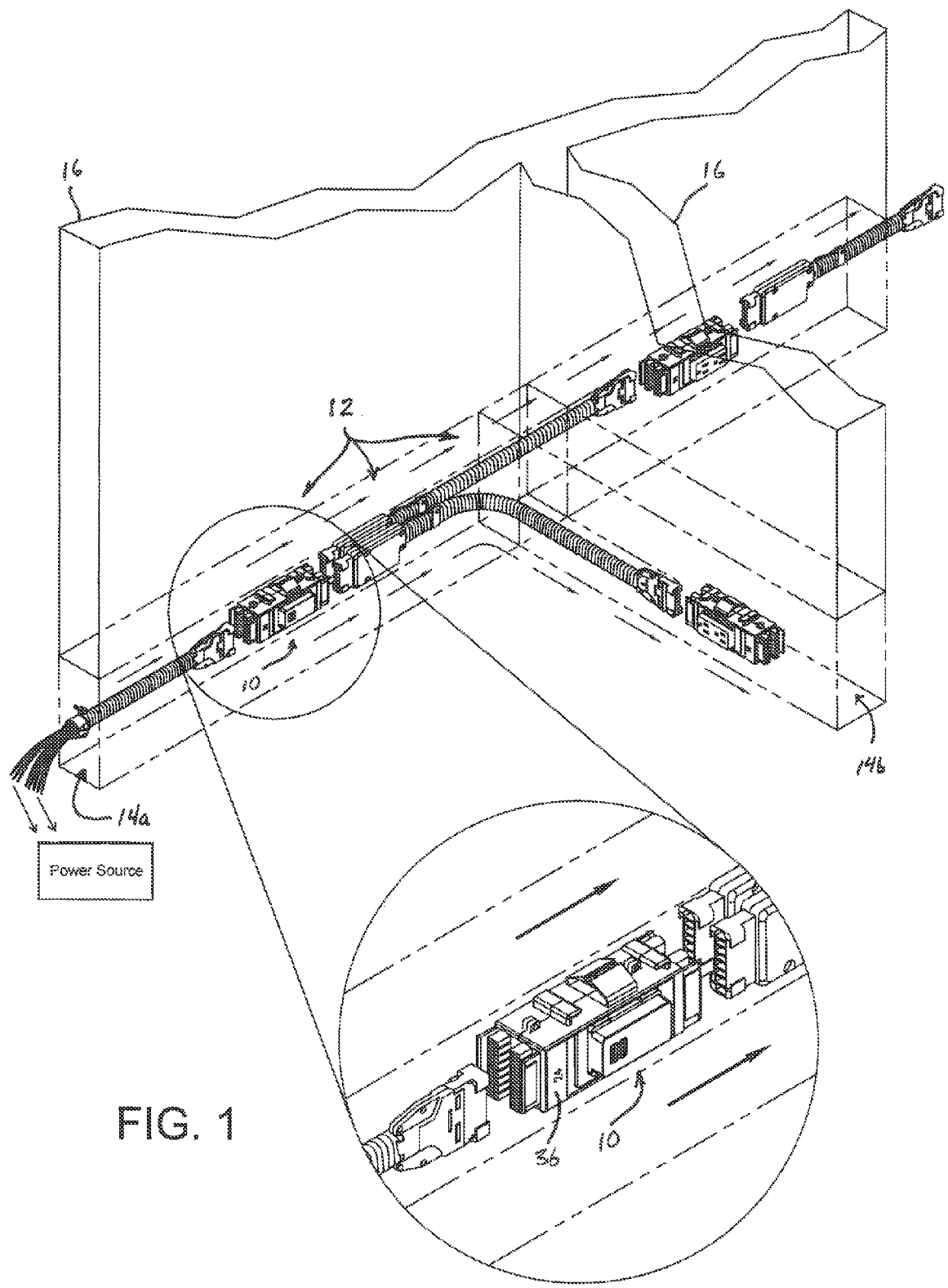
FIG. 1 is a perspective view of a modular electrical system in a raceway, including a low voltage power receptacle in accordance with the present invention.

Referring now to the drawings and the illustrative embodiments depicted therein, a low voltage power receptacle assembly 10 is configured for installation in a modular electrical system 12, which may be routed through one or more raceways 14a, 14b within an area such as a work space defined by walls 16, such as shown in FIG. 1. Power receptacle assembly 10 includes a two-piece housing 18 having a front housing piece or cover portion 18a and a rear housing piece or base portion 18b, such as shown in FIGS. 2-4. Housing 18 defines an internal cavity between internal surfaces of front housing piece 18a and rear housing piece 18b, for receiving electrical components of receptacle assembly 10, including a circuit board assembly 20, associated wiring 22, and electrical contacts 24 (FIGS. 5-9). As will be described in more detail below, circuit board assembly 20 receives electrical power from electrical wiring 22 and contacts 24, which carry line voltage (typically 110V AC or 220V AC), and then converts the high voltage power received from wiring 22 to a low voltage output at at least one low voltage receptacle 26.

Figure 25A:
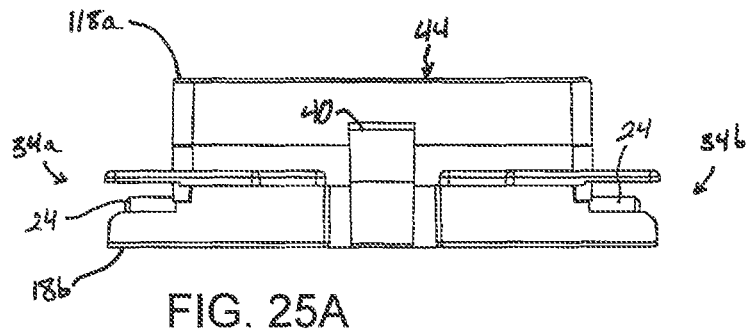
FIG. 25A is a bottom plan view of the low voltage power receptacle of FIG. 6.
Figure 25B:
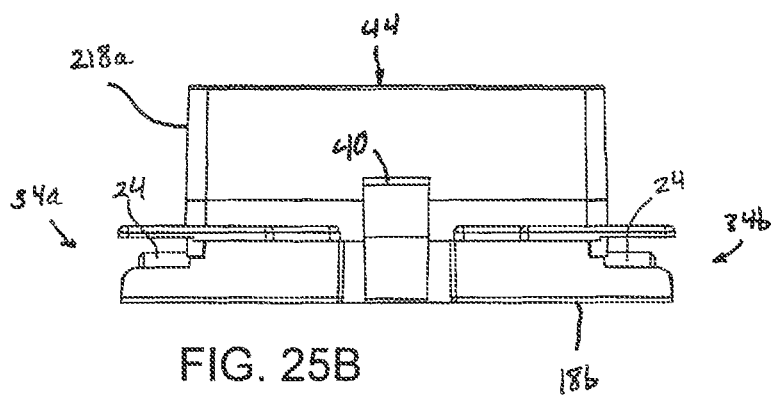
FIG. 25B is a bottom plan view of another of the low voltage power receptacle.
Figure 25C:
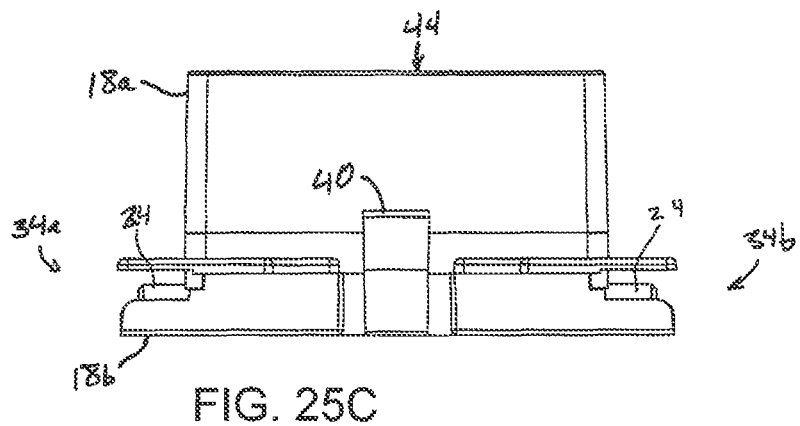
FIG. 25C is a bottom plan view of the low voltage power receptacle of FIG. 2.

Optionally, different sizes of housings may be constructed or assembled from a single base portion 18b combined with one of a variety of different top portions having different thicknesses or depths, such as to accommodate different installations in which base portion 18b may be recessed a greater or smaller distance from an opening through which the low voltage receptacle assembly is accessed by users. For example, and with reference to FIGS. 2-4, 8-10, 18A-18E, 21-24, and 25C, a relatively deep or thick cover portion 18a is coupled to base portion 18b, while in FIGS. 1, 5, 6, 11-13, and 25A a relatively shallow or thin cover portion 118a is coupled to base portion 18b, and in FIG. 25B a medium-depth cover portion 218a is shown coupled to base portion 18b.

Figure 18A:
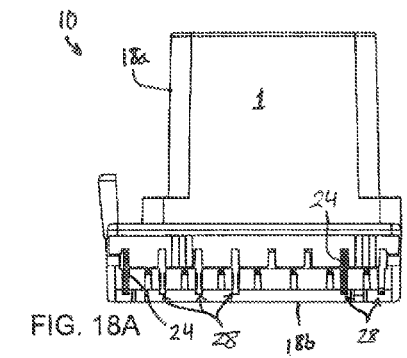
FIGS. 18A-18D are end elevations of the low voltage power receptacles corresponding to respective ones of FIGS. 17A-17D.
Figure 18B:
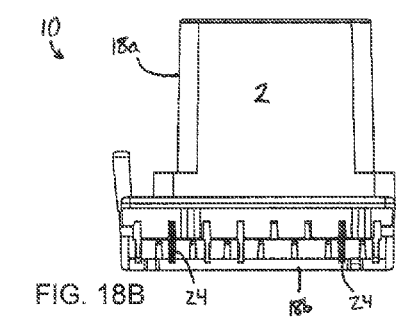
Figure 18C:
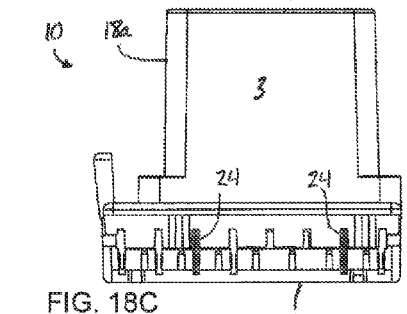
Figure 18D:
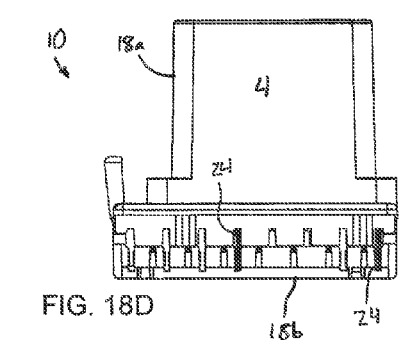
Figure 18E:
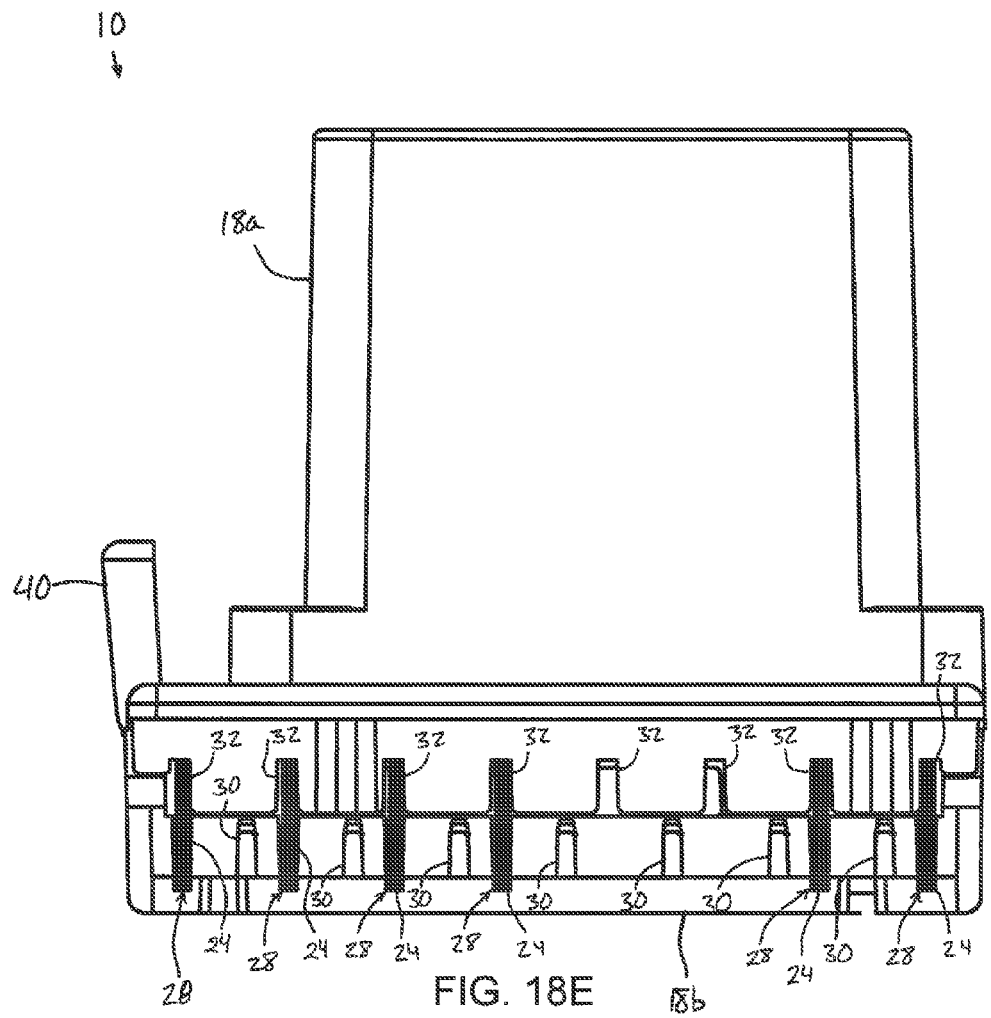
FIG. 18E is an enlarged end elevation of another low voltage power receptacle in which electrical terminals fill all available spaces in a connector end portion thereof.
Figure 19:
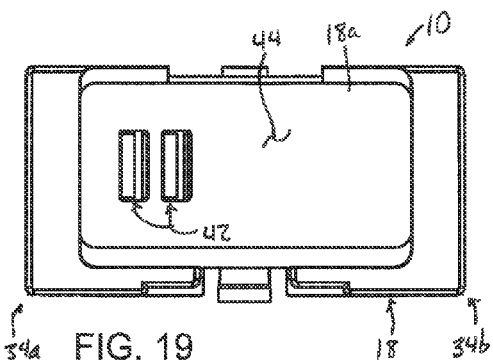
FIG. 19 is a front elevation of the low voltage power receptacle of FIG. 2.
Figure 20:
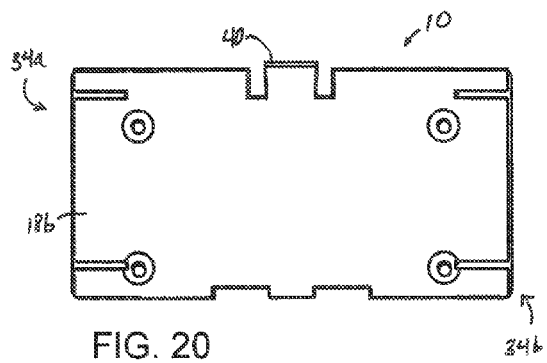
FIG. 20 is a rear elevation of the low voltage power receptacle of FIG. 2.
Figure 21:
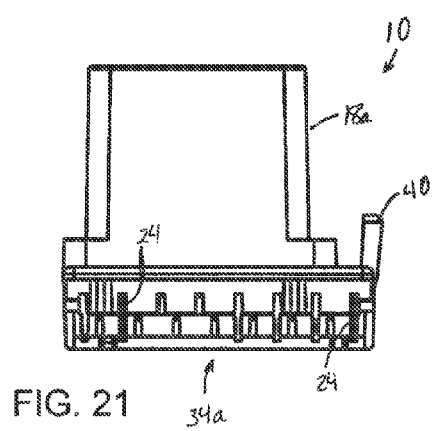
FIG. 21 is an upstream end elevation of the low voltage power receptacle of FIG. 2.
Figure 22:
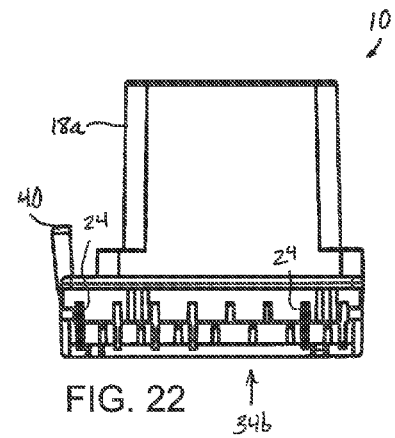
FIG. 22 is a downstream end elevation of the low voltage power receptacle of FIG. 2.
Figure 23:
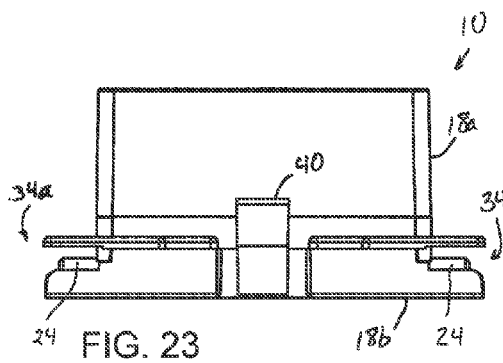
FIG. 23 is a bottom plan view of the low voltage power receptacle of FIG. 2.
Figure 24:
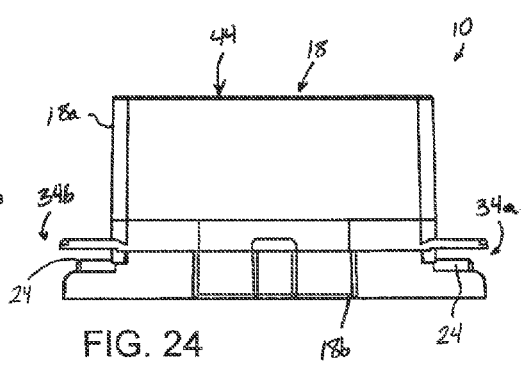
FIG. 24 is a top plan view of the low voltage power receptacle of FIG. 2.

Base portion 18b includes a plurality of contact-receiving channels 28, with upstanding isolator walls 30 disposed between channels 28, such as shown in FIGS. 5-6, 8-10, and 18A-18E. Cover portion 18a (as well as cover portions 118a and 218a) defines a corresponding plurality of contact-receiving channels 32 that are substantially aligned with respective ones of the contact-receiving channels 28 formed in base portion 18b, such as shown in FIGS. 18A-18E. Corresponding pairs of contact-receiving channels 28, 32 are configured to receive lower edge regions and upper edge regions (respectively) of electrical contacts 24 (such as best shown in FIG. 18E), each of which is positioned between a selected pair of contact-receiving channels according to a desired or selected electrical circuit to energize circuit board assembly 20, as will be described below.

Thus, front housing piece 18a and rear housing piece 18b cooperate to define coupler portions 34a, 34b at opposite ends thereof (FIGS. 2-4, 6, 10, 11, 17A-17D, and 19-25C), which are configured for electrical and mechanical coupling to a junction block 36, such as shown in FIGS. 1 and 11-13. Coupler portions 34a, 34b may be similar to couplers that are shown and described, for example, in commonly-owned U.S. Pat. No. 6,036,516, which is hereby incorporated herein by reference in its entirety.

Rear housing piece 18b defines a generally open central area 38 for receiving circuit board assembly 20, such as shown in FIGS. 5 and 6, which allows wiring 22 to be routed to the respective ends corresponding to coupler portions 34a, 34b, with electrical contacts 24 positioned in contact-receiving channels 28, such as shown in FIGS. 6 and 18E. Rear housing piece 18b includes an outwardly-projecting tab or spring latch 40 that is used for releasably securing low voltage power receptacle assembly 10 to junction block 36, as will be described below. Rear housing piece 18b may further include coupling structure such as resilient locking tabs or tab-receiving surfaces or the like, for securing rear housing piece 18b to front housing piece 18b (which may include corresponding coupling structure) such as in a snap-together arrangement. Optionally, it is envisioned that separate mechanical fasteners (e.g., threaded screws, rivets, etc.), adhesives, ultrasonic welding, or other methods or structures may be used to secure the housing pieces together.

Front housing piece 18a primarily defines an interior open space for receiving circuit board 20 and for providing access to low voltage receptacles 26 via openings 42 that are formed or established in a front surface 44 of front housing piece 18a (FIGS. 2-6). As noted above, different front housing pieces 18a, 118a, 218a may be used substantially interchangeably such as to accommodate different installation arrangements, and without affecting the overall function of the receptacle assembly. It will be appreciated that by using the relatively deep or thick cover portion 18a, substantial extra interior space is provided between the cover portion 18a and the base portion 18b. To position circuit board 20 with low voltage receptacles 26 arranged correctly relative to openings 42, a circuit board cradle 46 is positioned at open area 38 of base portion 18b, and behind circuit board 20, such as shown in FIGS. 7-9. Circuit board cradle 46 thus acts as a spacer and secures circuit board 20 in position in the extra large interior space that exists when base portion 18b is coupled to the deep cover portion 18a. Optionally, a thinner circuit board cradle may be provided for use when base portion 18b is coupled to the medium-depth cover portion 218a of FIG. 25B.

Circuit board 20 includes a substantially planar base 48 to which various electrical components are mounted, including the above-described wiring 22, electrical contacts 24, and low voltage receptacles 26, plus a low voltage switching power supply transformer 50 and capacitors 52 for power filtering. The electrical contacts 24 at either side of the receptacle assembly (i.e., at either of coupler portions 34a, 34b) receive high voltage (typically 110V AC or 220V AC) power from junction block 36 and direct it to circuit board 20 via wiring 22. Transformer 50 is operable to transform the high voltage power input to a low voltage output, such as about 2V DC to about 12V DC, which is supplied to low voltage receptacles 26, where users may access the low voltage power by coupling a cable or device through one of receptacle openings 42. In the illustrated embodiment, transformer 50 is a USB switching power supply transformer with a low voltage output of about 5V DC, although it will be appreciated that substantially any suitable electrical transformer may be used, without departing from the spirit and scope of the present invention. In addition, the low voltage receptacles 26 of the illustrated embodiment are USB power receptacles with socket-style USB receptacle openings housing respective electrical contacts, as is known in the art. However, it is envisioned that substantially any type of low voltage receptacle, terminals, or couplings may be used.

During assembly of low voltage power receptacle assembly 10, an operator or computer-controlled equipment selects the position of each electrical contact 24 (i.e., each contact 24 mounted and fixed in position at a chosen pair of contact-receiving channels 28, 32) according to the desired circuit that will be used to power the assembly 10. For example, in a four-circuit system 54 such as that shown in FIG. 14, four substantially identical low voltage power receptacle assemblies 10 may each have their respective contact configured so that each is powered by a separate circuit, represented by H1-H4. The positioning of each electrical conductor 24, for each of the four receptacle assemblies described above with reference to FIG. 14, is shown in FIGS. 18A-18D, which also correspond to FIGS. 17A-17D, respectively.

Figure 14:
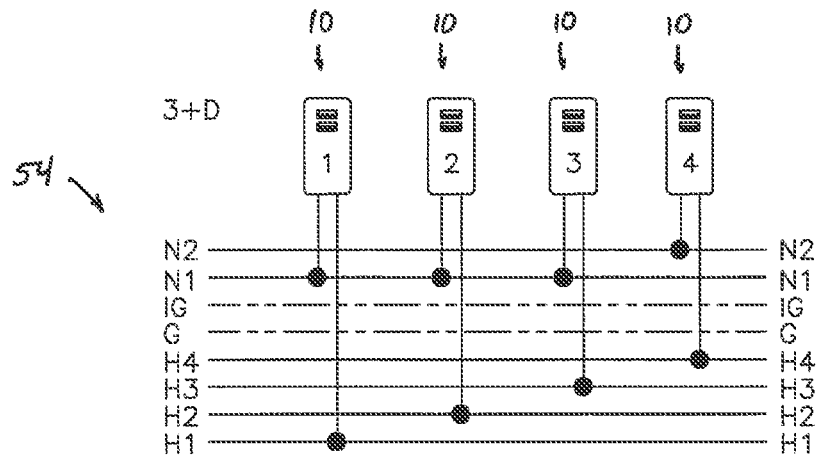
FIG. 14 is a wire diagram showing four low voltage power receptacles coupled to four electrical circuits of an 8-wire power system.
Figure 17A:
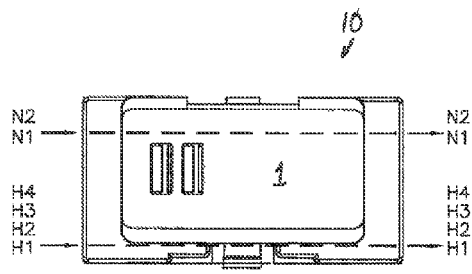
FIGS. 17A-17D are front elevations of low voltage power receptacles corresponding to those in FIG. 14, with simplified wire diagrams indicating the electrical wires that are used to supply power to each respective power receptacle.
Figure 17B:
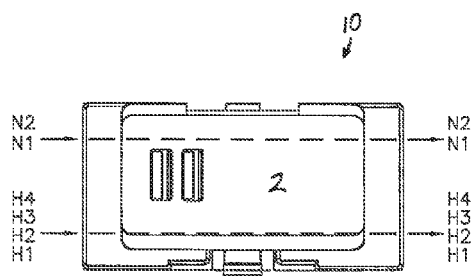
Figure 17C:
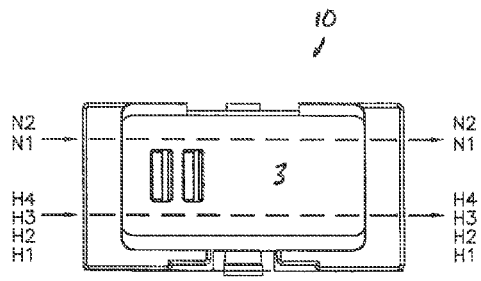
Figure 17D:
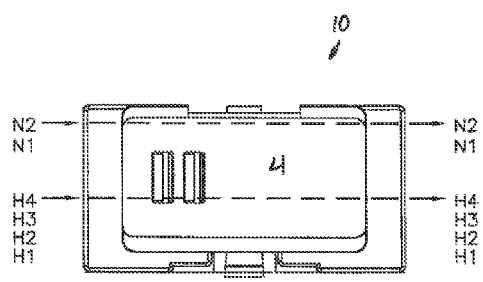

In the illustrated embodiment of FIG. 14, the first receptacle assembly is electrically coupled to a first neutral conductor N1 and a first hot or line conductor H1 (refer also to FIGS. 17A and 18A), the second receptacle assembly is electrically coupled to the first neutral conductor N1 and a second hot or line conductor H2 (refer also to FIGS. 17B and 18B), the third receptacle assembly is electrically coupled to the first neutral conductor N1 and a third hot or line conductor H3 (refer also to FIGS. 17C and 18C), and the fourth receptacle assembly is electrically coupled to a second neutral conductor N2 and a fourth hot or line conductor H4 (refer also to FIGS. 17D and 18D). Optionally, it is envisioned that circuit board 20 may be configured to receive power from any or all available circuits, in which case additional wiring and electrical contacts may be added such as shown in FIG. 18E, in which four contacts 24 are positioned for engagement with all four hot conductors and both neutral conductors of a four-circuit system, such as that of FIG. 14.

Figure 15:
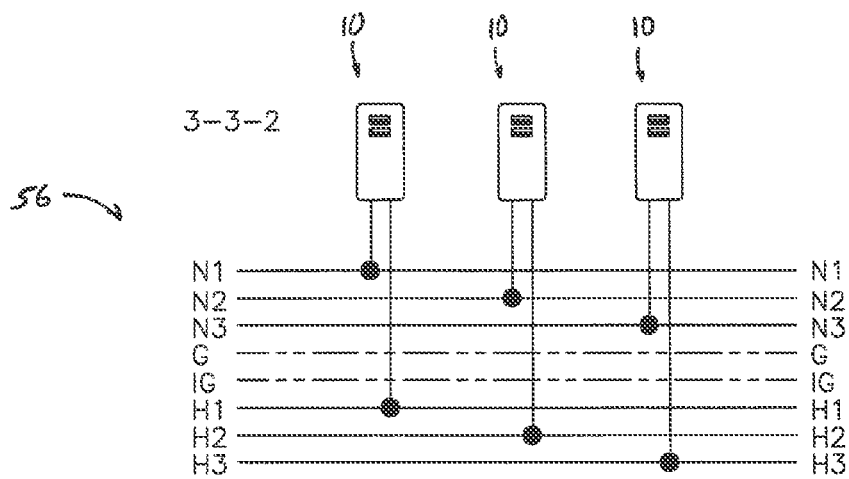
FIG. 15 is a wire diagram showing three low voltage power receptacles coupled to three isolated electrical circuits of another 8-wire power system.
Figure 16:
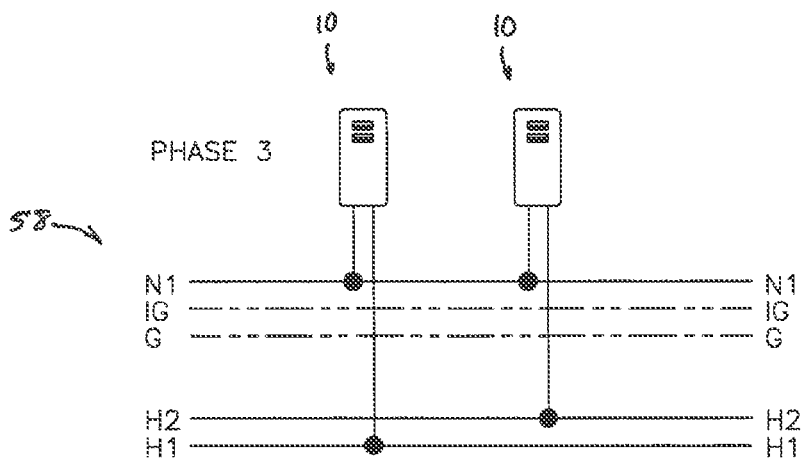
FIG. 16 is a wire diagram showing two low voltage power receptacles coupled to two electrical circuits of 5-wire power system.

Additional configurations are also envisioned, such as a three-circuit system 56 (FIG. 15) having three separate hot conductors H1-H3, three separate neutral conductors N1-N3, a ground conductor G, and an isolated ground conductor IG. In such an arrangement, as many as three power receptacle assemblies 10 may be powered by entirely separate circuits. In another arrangement, a two-circuit system 58 (FIG. 16) allows for power receptacle assemblies 10 to be electrically coupled in a similar manner as the first two assemblies 10 of system 54 in FIG. 14. Typically, ground conductors (such as shown in FIGS. 14-16) are not used for supplying power to the low voltage power receptacle assemblies 10.

Figure 11:
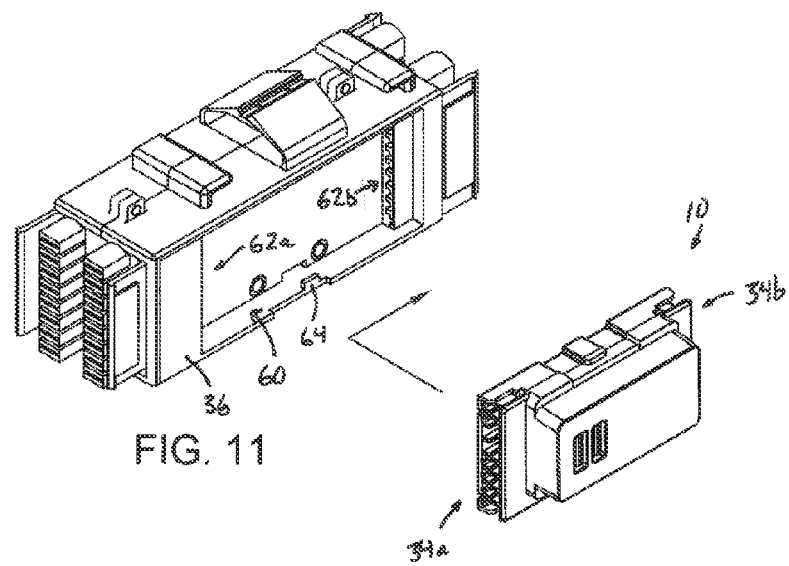
FIG. 11 is a front perspective view of a junction block and the low voltage power receptacle as in FIG. 1, prior to coupling of the receptacle to the junction block.
Figure 12:
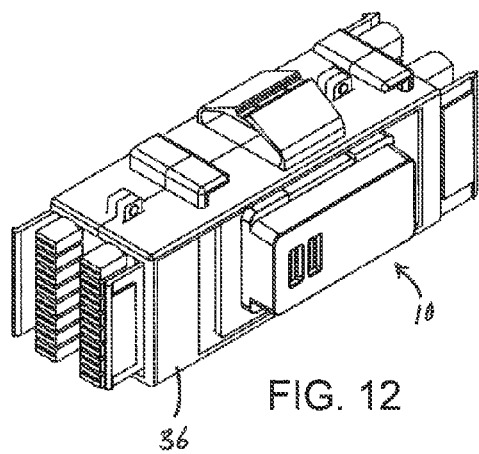
FIG. 12 is a front perspective view of the junction block and low voltage power receptacle of FIG. 11, shown with the receptacle coupled to the junction block.
Figure 13:
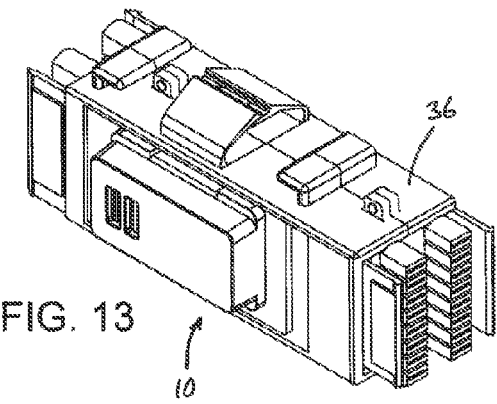
FIG. 13 is another front perspective view of the junction block and low voltage power receptacle of FIG. 12, taken from an opposite end thereof.

Referring now to FIGS. 11-13, low voltage power receptacle assembly 10 is electrically and mechanically coupled to junction block 36 by first inserting rear housing piece 18*b* into a recess or cavity 60 formed in junction block 36, and then sliding the receptacle assembly 10 to either side to thereby engage one of the coupler portions 34*a*, 34*b* with a corresponding junction block coupler 62*a*, 62*b* that is accessible in recess 60 (FIG. 11). Each junction block coupler 62*a*, 62*b* has two or more female electrical contacts that correspond to one or more electrical circuits that pass through junction block 36. The electrical contacts 24 of low voltage power receptacle assembly 10 form male contacts that are configured for engagement with respective ones of the female contacts found in the junction block couplers 62*a*, 62*b*. Thus, as described above, electrical contacts 24 are positioned in each coupler portion 34*a*, 34*b*, which allow the contacts 24 to engage the female contacts (of junction block couplers 62*a*, 62*b*) corresponding to the desired electrical circuit that will power a given low voltage power receptacle assembly 10.

Optionally, the electrical contacts 24 at coupler portion 34*a* may be positioned differently than the electrical contacts 24 at the other coupler portion 34*b* (i.e., configured to engage different circuits), so that an installer may choose between two different circuits that can be used to power a given low voltage power receptacle assembly 10. This selection may be made at the time of attaching receptacle assembly 10 to junction block 36, simply by choosing whether the assembly 10 will be installed with its coupler portion 34*a* engaging junction block coupler 62*a* (e.g., as shown in FIGS. 11-13), or with its other coupler portion 34*b* engaging junction block coupler 62*b*. Upon sliding engagement of low voltage power receptacle assembly 10 with junction block 36, tab 40 engages a corresponding tab or locking flange 64 (FIG. 11) at cavity 60, in order to limit or prevent inadvertent removal of receptacle assembly 10 from junction block 36. The various options and technical details of the electrical engagement and circuit-selection options for receptacle assembly 10, relative to junction block 36, may be more fully understood with reference to commonly-owned U.S. Pat. Nos. 6,036,516 and 7,465,178, which are hereby incorporated herein by reference in their entireties.

As noted above, low voltage power receptacle assembly 10 in configured to be mounted in a modular electrical system such as that indicated at reference numeral 12 in FIG. 1, which system 12 typically carries only high voltage power such as 110V AC or 220V AC. It is envisioned that the low voltage power receptacle assembly of the present invention may be compatible for use in substantially any high voltage electrical system, including being adaptable for use in hard-wired or non-modular systems, without departing from the spirit and scope of the present invention.

While low voltage power receptacle assembly 10 is shown and described as being compatible for use in a two-circuit, three-circuit, or four-circuit electrical system, it will be appreciated that the principles of the present invention may be adapted for single-circuit systems, or for electrical systems having more than four electrical circuits, simply by scaling the low voltage power receptacle assembly as needed to accommodate the desired number of circuit connection options, without departing from the spirit and scope of the present invention. It will further be appreciated that the specific arrangement or type of connectors may be adjusted as desired for substantially any application, or the receptacle assembly may be readily adapted for use in a non-modular system.

Accordingly, the low voltage power receptacle assembly of the present invention provides one or more low voltage power receptacles having a clean and permanent-looking appearance, such as in a work area, public space, or the like, without need for a low voltage wiring system that would be separate or distinct from a high voltage wiring system that may serve the same area. When incorporated into a modular electrical system that can be configured, reconfigured, and customized according to the needs of a particular area, the low voltage power receptacle assembly can be used to provide substantially any desired number of low voltage outlets in the same general area as high voltage outlets, and may even be installed in modular electrical systems having two or more electrical circuits.

Changes and modifications in the specifically-described embodiments may be carried out without departing from the principles of the present invention, which is intended to be limited only by the scope of the appended claims as interpreted according to the principles of patent law including the doctrine of equivalents.

The invention claimed is:

1. A low voltage power receptacle assembly in combination with a modular electrical system, comprising:
    a housing defining a cavity and a plurality of contact-receiving portions in spaced arrangement;
    at least two electrical contacts disposed in respective ones of said contact-receiving portions of said housing;
    a low voltage power receptacle;
    a circuit board assembly positioned in said cavity of said housing, wherein said circuit board assembly is in electrical communication with said at least two electrical contacts and with said low voltage power receptacle, and wherein said circuit board assembly is operable to transform a line voltage received at said electrical contacts to a lower voltage output at said low voltage power receptacle;
    a power supply line having at least two hot conductors, a neutral conductor, and a ground conductor, said power supply line having an upstream end portion configured to be electrically coupled to an AC power supply and a downstream end portion configured to be electrically coupled to said low voltage power receptacle assembly; and
    a junction block assembly configured to electrically and mechanically couple to said low voltage power receptacle assembly, and to supply AC power thereto;
    wherein only one of said hot conductors is in electrical communication with said circuit board assembly of said low voltage power receptacle assembly.

2. The receptacle assembly of claim 1, wherein said housing comprises a pair of coupler portions at opposite ends thereof, said coupler portions defining said contact-receiving portions and each coupler portion supporting at least two of said electrical contacts, wherein each of said coupler portions is configured to engage a corresponding coupler of a junction block assembly.

3. The receptacle assembly of claim 2, wherein said housing comprises at least six of said contact-receiving portions at each coupler portion, and wherein said electrical contacts are positionable in selected ones of said contact-receiving portions to thereby alter an electrical circuit to which said circuit board assembly is connected.

4. The receptacle assembly of claim 1, wherein said housing comprises a two-piece housing having a front housing piece and a rear housing piece, said front housing piece defining an opening configured to permit access to said low voltage power receptacle by an electrical connector.

5. The receptacle assembly of claim 4, wherein said front housing piece comprises one chosen from a first front housing piece and a second front housing piece, said first front housing piece having a greater depth and said second front housing piece having a lesser depth that is less than the depth of said first front housing piece, and wherein said rear housing piece is configured for coupling interchangeably to either of said first and second front housing pieces, whereby when said rear housing piece is coupled to said first front housing piece said cavity is larger than when said rear housing piece is coupled to said second front housing piece.

6. The receptacle assembly of claim 5, further comprising a circuit board cradle positioned between said rear housing piece and said circuit board assembly, wherein said circuit board cradle is configured for use when said rear housing piece is coupled to said first front housing piece.

7. The receptacle assembly of claim 1, wherein said contact-receiving portions of said housing comprise channels or slots formed in said housing.

8. The receptacle assembly of claim 7, wherein said housing comprises a two-piece housing having a front housing piece and a rear housing piece, said front housing piece defining a first portion of each channel or slot and said rear housing piece defining a second portion of each channel or slot.

9. The receptacle assembly of claim 1, wherein said circuit board assembly comprises an electrical power transformer.

10. The receptacle assembly of claim 1, wherein said circuit board assembly further comprises said low voltage power receptacle, and wherein said circuit board assembly is in electrical communication with said at least two electrical contacts via an electrical wire associated with each of said electrical contacts.

11. A low voltage power receptacle assembly in combination with a modular electrical system, comprising:
  a housing including a rear housing piece and a front housing piece chosen from a first front housing piece having a greater depth and said second front housing piece having a lesser depth that is less than the depth of said first front housing piece, said housing defining a plurality of contact-receiving portions in spaced arrangement, and said rear housing piece cooperating with said front housing piece to define a cavity, wherein said cavity is relatively larger when said front housing piece comprises said first front housing piece and said cavity is relatively smaller when said front housing piece comprises said second front housing piece;
  at least two electrical contacts disposed in respective ones of said contact-receiving portions of said housing;
  a low voltage power receptacle;
  a circuit board assembly positioned in said cavity of said housing, wherein said circuit board assembly is in electrical communication with said at least two electrical contacts and with said low voltage power receptacle, and wherein said circuit board assembly is operable to transform a line voltage received at said electrical contacts to a lower voltage output at said low voltage power receptacle;
  a spacer positionable between said rear housing piece and said low voltage power receptacle when said rear housing piece is coupled to said first front housing piece;
  a power supply line having at least two hot conductors, a neutral conductor, and a ground conductor, said power supply line having an upstream end portion configured to be electrically coupled to an AC power supply and a downstream end portion configured to be electrically coupled to said low voltage power receptacle assembly; and
  a junction block assembly configured to electrically and mechanically couple to said low voltage power receptacle assembly, and to supply AC power thereto;
  wherein only one of said hot conductors is in electrical communication with said circuit board assembly of said low voltage power receptacle assembly.

12. The receptacle assembly of claim 11, wherein said housing comprises a pair of coupler portions at opposite ends thereof, said coupler portions defining said contact-receiving portions and each coupler portion supporting at least two of said electrical contacts, wherein each of said coupler portions is configured to engage a corresponding coupler of a junction block assembly.

13. The receptacle assembly of claim 12, wherein said spacer comprises a circuit board cradle positioned between said rear housing piece and said circuit board assembly when said rear housing piece is coupled to said first front housing piece.

14. The receptacle assembly of claim 11, wherein said front housing piece comprises one chosen from said first front housing piece, said second front housing piece, and a third front housing piece having a moderate depth that is less than the depth of said first front housing piece and greater than the depth of said second front housing piece.

15. The receptacle assembly of claim 11, wherein said circuit board assembly further comprises said low voltage power receptacle, and wherein said circuit board assembly is in electrical communication with said at least two electrical contacts via an electrical wire associated with each of said electrical contacts.

16. The receptacle assembly of claim 15, wherein said low voltage power receptacle is accessible through an opening formed in said housing.

* * * * *